United States Patent
Shi et al.

(10) Patent No.: US 12,450,053 B2
(45) Date of Patent: Oct. 21, 2025

(54) SYSTEM AND METHOD USING ASSEMBLING COMPONENTS FOR DEVELOPING SOFTWARE

(71) Applicants: DIGIWIN CO., LTD., Shanghai (CN); DATA SYSTEMS CO., LTD., New Taipei (TW)

(72) Inventors: Rongjun Shi, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 247 days.

(21) Appl. No.: 18/298,336

(22) Filed: Apr. 10, 2023

(65) Prior Publication Data
US 2024/0272903 A1    Aug. 15, 2024

(30) Foreign Application Priority Data
Feb. 10, 2023    (CN) .......................... 202310099508.0

(51) Int. Cl.
G06F 8/70    (2018.01)
G06F 8/77    (2018.01)
G06F 16/245    (2019.01)

(52) U.S. Cl.
CPC .............. *G06F 8/77* (2013.01); *G06F 16/245* (2019.01)

(58) Field of Classification Search
CPC ..... G06F 8/20; G06F 8/30; G06F 8/36; G06F 8/77; G06F 16/245
See application file for complete search history.

(56) References Cited

U.S. PATENT DOCUMENTS

| | | | |
|---|---|---|---|
| 2017/0206069 A1* | 7/2017 | Erwin | G06F 8/71 |
| 2023/0053820 A1* | 2/2023 | Pokorny | G06F 8/61 |
| 2023/0092628 A1* | 3/2023 | Meeks | G06F 16/248 717/102 |
| 2023/0096209 A1* | 3/2023 | Chen | G16H 10/60 717/109 |

* cited by examiner

*Primary Examiner* — Hanh Thi-Minh Bui
(74) *Attorney, Agent, or Firm* — JCIPRNET

(57) ABSTRACT

A software development system and a software development method are provided. The software development system includes an electronic device and a server. The electronic device executes an interface module to obtain input data. The server includes a database, a query matching module, and a component assembly module. The query matching module obtains at least one of multiple target components and at least one functional component according to the input data and the database. The component assembly module assembles the detected target components to generate an integrated component. The component assembly module provides the integrated component to the database. The component assembly module provides the functional component to the database, so as to improve the quality and the efficiency of software development.

14 Claims, 5 Drawing Sheets

SYSTEM AND METHOD USING ASSEMBLING COMPONENTS FOR DEVELOPING SOFTWARE

CROSS-REFERENCE TO RELATED APPLICATION

This application claims the priority benefit of China application serial no. 202310099508.0, filed on Feb. 10, 2023. The entirety of the above-mentioned patent application is hereby incorporated by reference herein and made a part of this specification.

BACKGROUND

Technical Field

The disclosure relates to a software system, and in particular to a software development system and a software development method applying component technology.

Description of Related Art

Generally speaking, software may be split into one or more components, so the software developer may assemble one or more components as output software to implement the target function. However, the current software development system is manually assembled through the operating system of the developer, which reduces the operating efficiency. In addition, the current software development system relies on the individual capability of the software developer, which causes uneven quality of output software.

On the other hand, the current assembly operation combines the original software with a reusable component or a plug-in. However, the assembly manner is limited by the reusable component, the plug-in, or the original software, so that the output software may implement functions other than the target function, which causes a waste of resources.

SUMMARY

The disclosure provides a software development system, which can automatically assemble components and generate an integrated component that fits a target function to improve the quality and the efficiency of software development.

According to an embodiment of the disclosure, a software development system of the disclosure includes an electronic device and a server. The electronic device is configured to execute an interface module to obtain input data. The server is coupled to the electronic device. The server includes a database, a query matching module, and a component assembly module. The query matching module is configured to obtain at least one of multiple target components and at least one functional component according to the input data and the database. The component assembly module is configured to assemble the detected target components to generate at least one integrated component. The component assembly module is configured to provide the at least one integrated component to the database. The component assembly module is configured to provide the at least one functional component to the database.

According to an embodiment of the disclosure, a software development method of the disclosure includes the following steps. An interface module is executed through an electronic device to obtain input data. At least one of multiple target components and at least one functional component is obtained through a query matching module of a server according to the input data and a database of the server. The detected target components are assembled through a component assembly module of the server to generate at least one integrated component. The at least one integrated component is provided to the database through the component assembly module. The at least one functional component is provided to the database through the component assembly module.

Based on the above, the software development system and the software development method of the disclosure may obtain the target components and/or the functional component that fit the target function according to the input data, so as to generate the integrated component. Therefore, the software development system may dynamically assemble and integrate components based on the target function, which can improve the quality and the efficiency of software development and can reduce the cycle of software development and the waste of resources.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
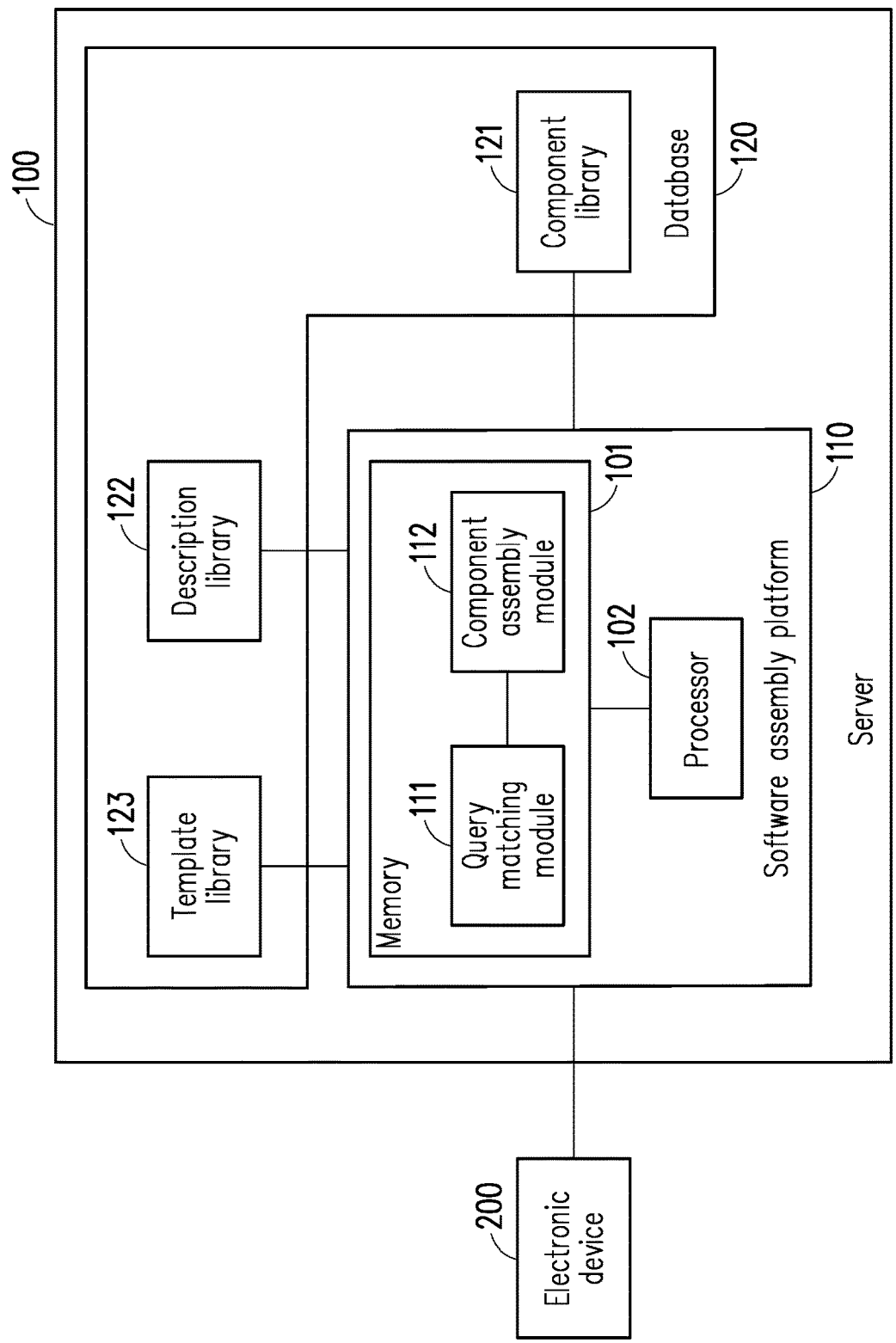
FIG. 1 is a circuit block diagram of a software development system according to an embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

FIG. 1 is a circuit block diagram of a software development system according to an embodiment of the disclosure. Referring to FIG. 1, a software development system 10 may be a system applying component technology to provide a user with software development. A component may be, for example, a modular and replaceable independent part of the software development system 10. The component may be replaced by another component of the same type. Components may provide services through respective interfaces to implement certain functions. Connections between different components involve matching between corresponding functions.

In the embodiment, the software development system 10 may include a server 100 and an electronic device 200. The electronic device 200 is coupled to the server 100. The user may operate the electronic device 200 and access the server 100 through the electronic device 200. The electronic device 200 may be, for example, a mobile phone, a tablet computer, a notebook computer, a desktop computer, etc.

In the embodiment, the server 100 may include a software assembly platform 110 and a database 120. The software assembly platform 110 is coupled to the database 120 and the electronic device 200. In the embodiment, the database 120 may include a component library 121, a description library 122, and a template library 123. The component library 121, the description library 122, and the template library 123 may respectively store data of different types or forms. The component library 121, the description library 122, and the template library 123 may be integrated in the same database 120. In some embodiments, the component library 121, the description library 122, and the template library 123 may be mutually independent databases.

In the embodiment, the software assembly platform 110 may include a memory 101 and a processor 102. The memory 101 is coupled to the processor 102. The memory 101 may store a query matching module 111, a component assembly module 112, and each module and relevant algorithms thereof mentioned in various embodiments of the disclosure and may also store relevant algorithms, programs, and data for implementing the function of automatically assembling components of the disclosure, such as computing software. The memory 101 may be, for example, a dynamic random access memory (DRAM), a flash memory, or a non-volatile random access memory (NVRAM), which is not limited in the disclosure.

In the embodiment, the processor 102 may access data and each module in the memory 101 and may also access data provided by the component library 121, the description library 122, the template library 123, and the electronic device 200. The processor 102 may be, for example, a signal converter, a field programmable gate array (FPGA), a central processing unit (CPU), other programmable general-purpose or specific-purpose microprocessors, digital signal processors (DSP), programmable controllers, application specific integrated circuits (ASIC), programmable logic devices (PLD), other similar devices, or a combination of the devices, which may load and execute computer program-related firmware or software to implement functions such as analysis, assembly, and packaging.

Figure 2:
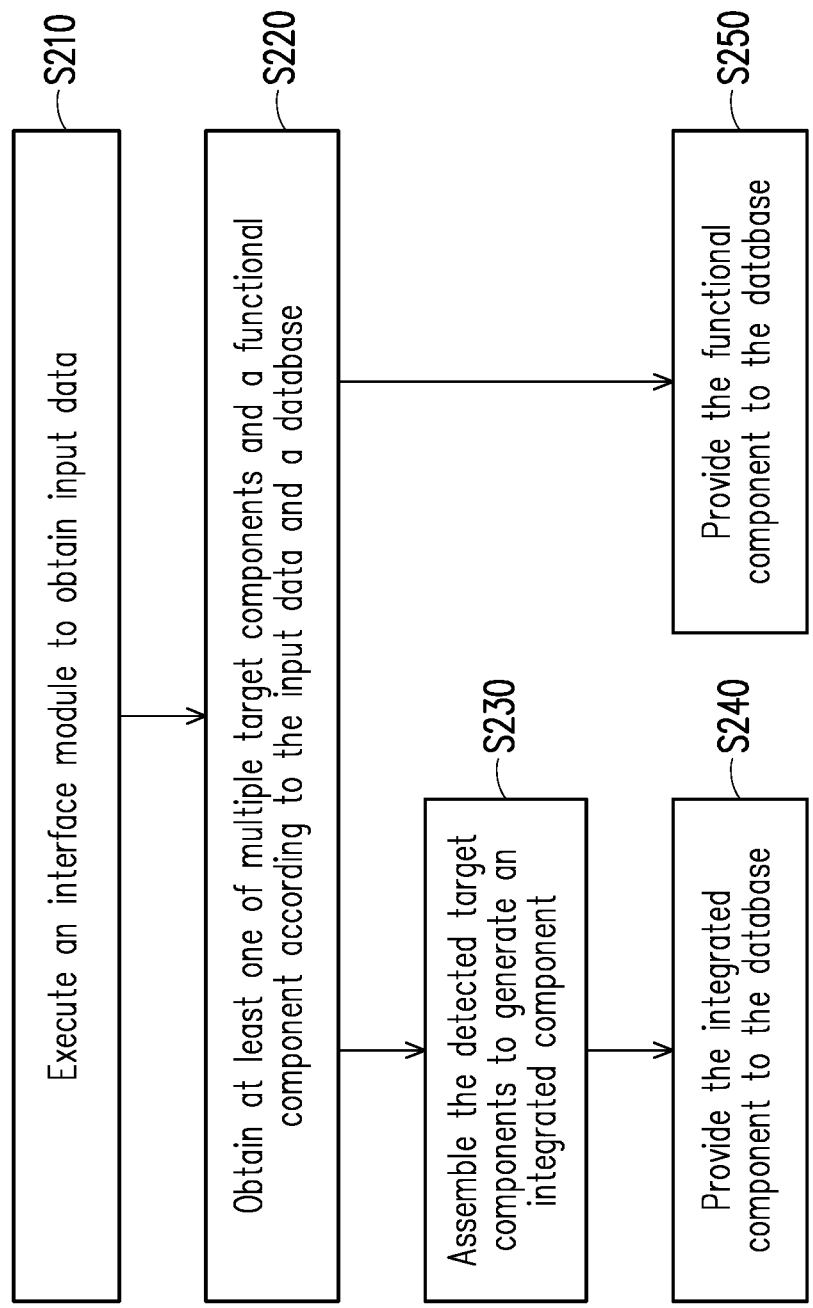
FIG. 2 is a flowchart of a software development method according to an embodiment of the disclosure.

FIG. 2 is a flowchart of a software development method according to an embodiment of the disclosure. Referring to FIG. 1 and FIG. 2, the software development system 10 may execute Steps S210 to S250 below. The sequence of Steps S210 to S250 is only exemplary and is not limited thereto. In the embodiment, Steps S210 to S250 may be applied to the following exemplary situations.

In the embodiment, the user operates the electronic device 200 to execute an interface module (not shown) stored in the electronic device 200. The electronic device 200 accesses the server 100 through the interface module. The interface module may be, for example, an application programming interface (API).

In Step S210, the electronic device 200 executes the interface module to obtain input data. In other words, when the user operates the electronic device 200 to input information, the electronic device 200 and the processor 102 respectively obtain the information (that is, the input data) through the interface module. The input data may be, for example, software information expected to be generated by the user. The input data may be expressed in vernacular, machine language, or a combination of the foregoing.

In Step S220, the processor 102 executes the query matching module 111, so that the query matching module 111 obtains at least one of multiple target components and a functional component according to the input data and the database 120. The number of functional components may be one or more. In other words, the query matching module 111 queries at least one of the component library 121, the description library 122, and the template library 123 according to the input data to obtain the target components and/or the functional components matching the input data.

In the embodiment, the target component may be, for example, a component that has a coupling relationship with other components, so the target components have a coupling relationship. The coupling relationship may be, for example, the coupling of data, behaviors, or a combination of the foregoing between multiple components. The target components may be assembled into another component through a connector (for example, a connector 413 shown in FIG. 4B) to implement complex functions.

In the embodiment, the functional component may be, for example, a component that has no coupling relationship with other components, so the target components have no coupling relationship with the functional component. One or more functional components may be independent components or an aggregate of components to implement simple functions.

In Step S230, the processor 102 executes the component assembly module 112, so that the component assembly module 112 assembles the detected target components to generate an integrated component. The number of integrated components may be one or more. In other words, after the target components are detected, the component assembly module 112 assembles the detected target components into the integrated component. In the embodiment, the assembling operation includes assembling the target components into a higher-level component, independent software, or system (that is, the integrated component) through assembly language and connection logic. In the embodiment, the integrated component may be, for example, a complex sub-component or software for implementing the function expected by the user.

In Step S240, the processor 102 executes the component assembly module 112, so that the component assembly module 112 provides the integrated component to the database (for example, the component library 121). The component library 121 stores the integrated component. In the embodiment, the electronic device 200 accesses the component library 121 through the interface module, so the electronic device 200 obtains the assembled and formed integrated component through the interface module.

Since the functional component is a component or an aggregate for implementing simple functions, in Step S250, the processor 102 executes the component assembly module 112, so that the component assembly module 112 directly provides the functional component to the database (for example, the component library 121). The component library 121 stores the functional component. In the embodiment, the electronic device 200 accesses the component library 121 through the interface module, so the electronic device 200 obtains the formed functional component through the interface module.

It is worth mentioning that the query matching module 111 may query the component library 121, the description library 122, and/or the template library 123 according to the input data provided by the user to obtain at least one matching component (that is, the target components and/or the functional component), so the software development system 10 can automatically obtain the target components and/or the functional component that fit the target function. In addition, the component assembly module 112 may provide the assembled integrated component to the database (for example, the component library 121) according to the matching component or may directly provide the functional component to the database. Therefore, the software development system 10 can dynamically assemble and integrate the matching components based on actual requirements of the user to output a software product that fully fits the requirements. In this way, the software development system 10 can improve the reliability and the maintainability of software development, while improving the quality and the efficiency of software development and reducing the cycle of software development and the waste of resources.

Figure 3:
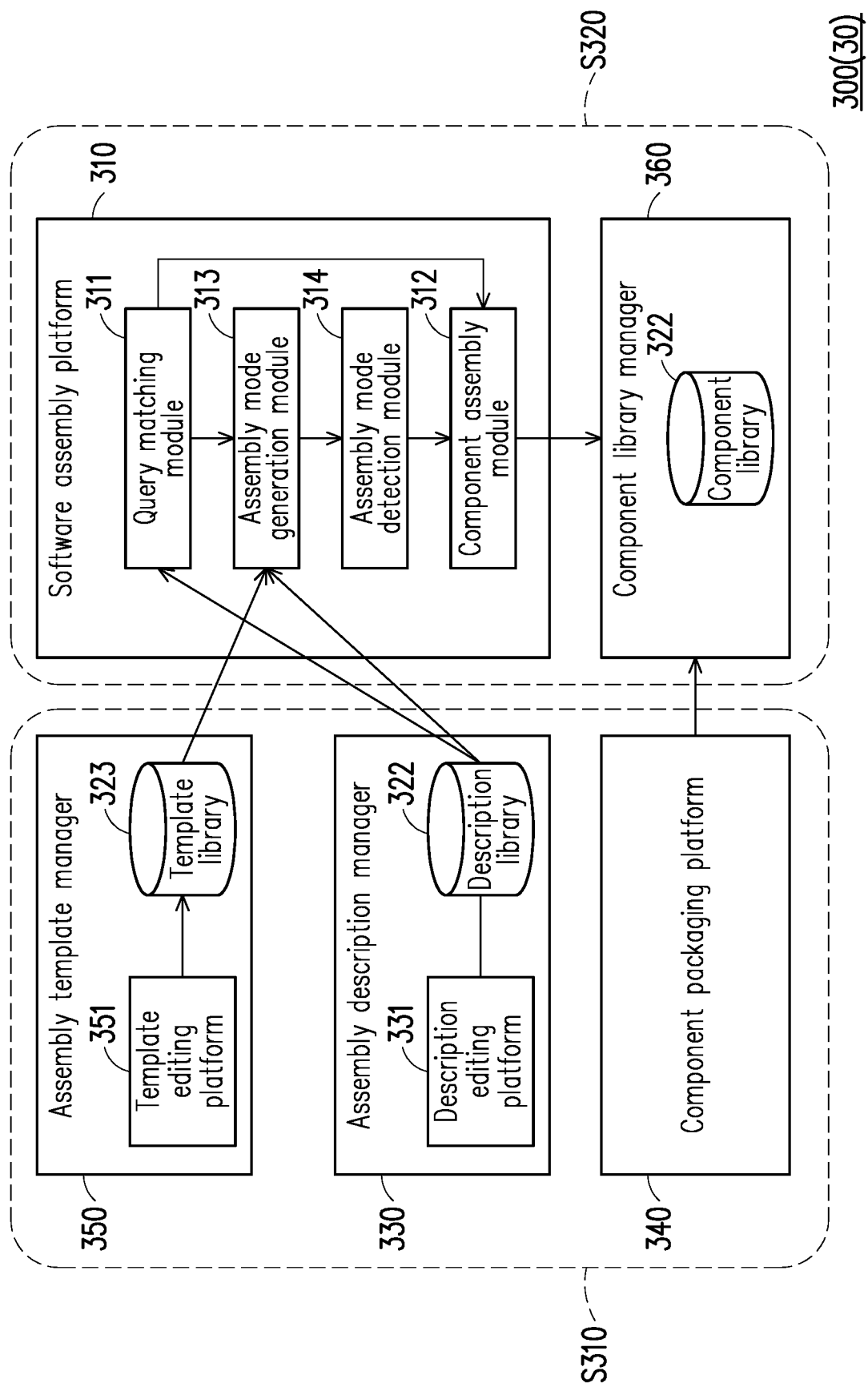
FIG. 3 is a circuit block diagram of a software development system according to another embodiment of the disclosure.

FIG. 3 is a circuit block diagram of a software development system according to another embodiment of the disclosure. Referring to FIG. 3, a software development system 30 may be a system applying component technology to provide the user with software development. A server 300 included in the software development system 30 may be analogized with reference to the relevant description of the software development system 10 and the server 100, so there will be no repetition. In the embodiment, the server 300 may include a software assembly platform 310, an assembly description manager 330, a component packaging platform 340, an assembly template manager 350, and a component library manager 360.

In an embodiment of a software design, the user operates the electronic device (for example, the electronic device 200 of FIG. 1) to access the server 300 through the interface module. At this time, the server 300 executes a design module S310 to enable at least one of the assembly description manager 330 and the assembly template manager 350 for managing a component and the component packaging platform 340 for packaging a component.

In the embodiment, the assembly description manager 330 may include a description editing platform 331 and a description library 322. The assembly description manager 330 may access the description library 322. The assembly description manager 330 may provide a component description file, a component connection description file, and a component framework description file to the description library 322 of the database. The description library 322 may store the various description files. In the embodiment, the description editing platform 331 may provide a visual description tool to describe the description files.

Specifically, the assembly description manager 330 describes a component through the description editing platform 331 to generate a description file set. The description file set describes different information about the component and may be used as the basis for component assembly. The description file set may include the component description file, the component connection description file, and the component framework description file. In other words, the description editing platform 331 maintains the description files in the description library 322.

In detail, the component description file describes basic information of the component. The basic information may include the number of the component, the name of the component, the version information of the component, the type of the component, the running mode of the component, the field to which the component belongs, the description of the component, and interface information contained in the component. The interface information may contain the name, the range, access parameters, the return value, and other data of an interface. In the embodiment, the component connection description file describes the access relationship between multiple components. The access relationship may contain the numbers of a source component and a target component, the number of a combined composite component, and connection information between the components. The connection information may contain data such as information of a connection interface and information of an adapter between the connection interface and the interface. In the embodiment, the component framework description file describes information about a framework. The information may include the number of the composite component corresponding to the framework, the number of a member sub-component, an assembly mode corresponding to the member sub-component, and the connection information about the components referenced from the component connection description file in the assembly mode.

In the embodiment, the component packaging platform 340 may access the component library 321. The component packaging platform 340 may provide the packaged functional component to the component library 321. On the other hand, the component assembly module 312 may provide the functional component without any coupling relationship and the assembled integrated component to the component library 321. The component library 321 may store the various components. In the embodiment, the component packaging platform 340 may be, for example, an independent companion module to independently perform packaging and/or access operations. Specifically, the component packaging platform 340 may be, for example, a visual low-code designer to perform the packaging operation through a graphical operation, so as to generate (or add) an effective and packaged functional component.

In the embodiment, the assembly template manager 350 may include a template editing platform 351 and a template library 323. The assembly template manager 350 may access the template library 323. The assembly template manager 350 may provide direct mode component assembly template data and indirect mode component assembly template data (that is, component assembly template data) to the template library 323. The template library 323 may store the component assembly template data. In the embodiment, the template editing platform 351 may provide a visual editing tool to edit and manage a component assembly template.

Specifically, the assembly template manager 350 abstracts the component assembly template data through the template editing platform 351 to generate one or more component assembly templates for assembling the components. The assembly template manager 350 extracts an assembly mode for assembling the components (that is, the component assembly template) through the template editing platform 351.

In the embodiment, the component assembly template data describes the assembly mode of a component. The component assembly template data may include information such as the number of a template, the function description of the template, a component collection involved in the template, and an assembly transfer mode and an assembly code between multiple components. In the embodiment, the component assembly template data may be divided into the direct mode component assembly template data and the indirect mode component assembly template data according to the type. In other words, the template editing platform 351 maintains the template files in the template library 323.

For the direct mode, such type of template defines the specific component information and assembly information needed to complete a complex function. Since the direct mode component assembly template data includes the defined specific component information and assembly information, in an embodiment of software assembly, the software assembly platform 310 directly uses the direct mode component assembly template data.

For the indirect mode, such type of template defines component type information needed to complete a complex function. Since the indirect mode component assembly template data includes the component type information, in the embodiment of software assembly, the software assembly platform 310 queries the specific required component according to the indirect mode component assembly template data for dynamic assembly, connection, and/or or frame replacement.

In the embodiment, the assembly mode has a certain applicable range of component assembly operating manners. For example, it is assumed that the assembly template manager 350 provides a composite component A, a sub-component B, and a sub-component C. The assembly template manager 350 generates the component assembly templates that are assembled in different modes. The mode may include a connection mode, a parallel mode, a selection mode, a repeat mode, a sequential mode, and a restricted mode.

In detail, the connection mode may include the following assembly steps. The composite component A obtains entry information through an entry access point. The entry information is transferred to the sub-component B through a mapping interface b1 of an interface a1. After the sub-component B is executed, connections b2 and c2 between the sub-components B and C respectively transfer information to the sub-component C. After the sub-component C is executed, a mapping interface a2 of an interface c1 outputs exit information. In the embodiment, the parallel mode may include the following assembly steps. The function of an accessing interface a1 of the composite component A is to execute in parallel an accessing interface b1 of the sub-component B and an accessing interface c1 of the sub-component C. In the embodiment, the selection mode may include the following assembly steps. The function of the accessing interface a1 of the composite component A is to selectively execute the accessing interface b1 of the sub-component B and the accessing interface c1 of the sub-component C. In the embodiment, the repeat mode may include the following assembly steps. The function of the accessing interface a1 of the composite component A is to execute multiple times the accessing interface b1 of the sub-component B. In the embodiment, the sequential mode may include the following assembly steps. The function of the accessing interface a1 of the composite component A is to execute the accessing interface c1 of the sub-component C after executing the accessing interface b1 of the sub-component B. In the embodiment, the restricted mode may include the following assembly steps. The function of the accessing interface a1 of the composite component A is to execute the accessing interface b1 of the sub-component B after removing certain functions.

In the embodiment of software assembly, the user operates the electronic device to access the server 300 through the interface module. At this time, the server 300 executes an assembly module S320 to enable the component library manager 360 for managing the component and the software assembly platform 310 for assembling the components.

In the embodiment, the software assembly platform 310 may provide a visual platform to implement an assembly operation of the components. The software assembly platform 310 may include multiple modules 311 to 314 to respectively perform query matching of the components, generation of the assembly mode, detection of the assembly mode, and automatic assembly of the components through the modules 311 to 314. Specifically, the software assembly platform 310 may include a query matching module 311, an assembly mode generation module 313, an assembly mode detection module 314, and a component assembly module 312.

In the embodiment, the query matching module 311 may query the component library 321 based on a semantic analysis module (not shown) according to the input data provided by the user to obtain the functional component. In other words, the query matching module 311 performs semantic analysis on the input data. The query matching module 311 queries the packaged functional component in the component library 321 according to semantically analyzed information to obtain one or more functional components conforming to the semantics of the input data.

Figure 4A:
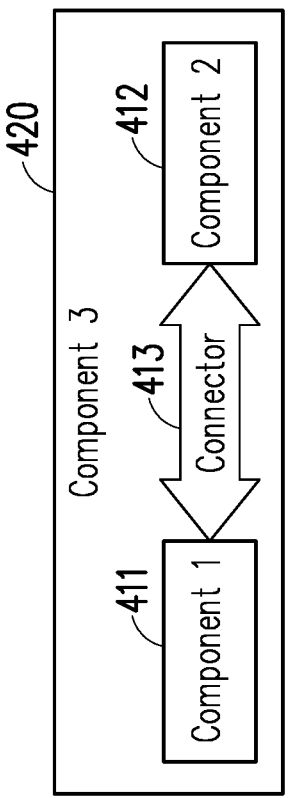
FIG. 4A is a schematic diagram of a functional component according to an embodiment of the disclosure.

Referring to FIG. 4A together, FIG. 4A is a schematic diagram of a functional component according to an embodiment of the disclosure. In the embodiment, a functional component 411 exemplified by "Component 1" and a functional component 412 exemplified by "Component 2" have no coupling relationship between data and/or behaviors. The functional components 411 and 412 may be aggregated into a component 410 exemplified by "Component 3". The component 410 is configured to implement simple functions.

When the query matching module 311 obtains the functional components 411 and 412 from the component library 321, the query matching module 311 provides the functional components 411 and 412 without any coupling relationship to the component assembly module 312. The component assembly module 312 provides the functional components 411 and 412 to the component library 321. Therefore, the user can access the functional components 411 and 412 in the component library 321 through the interface module.

Following the above description, the query matching module 311 may also query the description library 322 based on the semantic analysis module according to the input data provided by the user to obtain the target components matching the input data. In other words, the query matching module 311 performs semantic analysis on the input data. The query matching module 311 queries various description files in the description library 322 according to semantically analyzed information to obtain the target components conforming to the semantics of the input data.

Figure 4B:
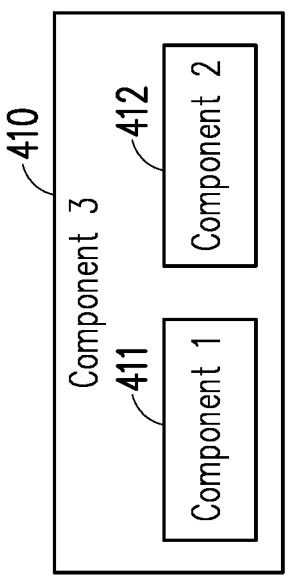
FIG. 4B is a schematic diagram of a target component according to an embodiment of the disclosure.

Referring to FIG. 4B together, FIG. 4B is a schematic diagram of a target component according to an embodiment of the disclosure. In the embodiment, the target component 411 exemplified by "Component 1" and the target component 412 exemplified by "Component 2" have a coupling relationship between data and/or behaviors. The target components 411 and 412 may be assembled into another component 420 exemplified by "Component 3" through the connector 413. The component 420 is configured to implement complex functions.

Figure 5A:
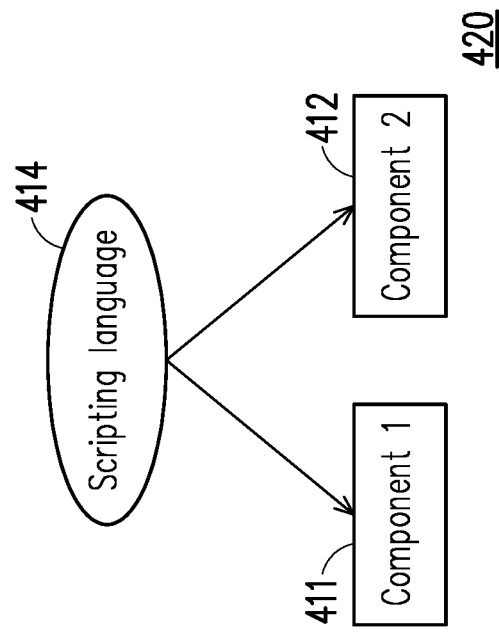
FIG. 5A is a schematic diagram of a target component according to another embodiment of the disclosure.

Referring to FIG. 5A together, FIG. 5A is a schematic diagram of a target component according to another embodiment of the disclosure. In the embodiment, multiple adapters 413-1 and 413-2 and a callback queue 413-3 may be, for example, examples of the connector 413 shown in FIG. 4B. In detail, when the coupling relationship (for example, a logical relationship) between the target component 411 and the target component 412 is not complex, the target component 411 may be coupled to the target component 412 through the adapter 413-1, the callback queue 413-3, and the adapter 413-2. The target components 411 and 412, the adapters 413-1 and 413-2, and the callback queue 413-3 may be assembled into another component 420.

Figure 5B:
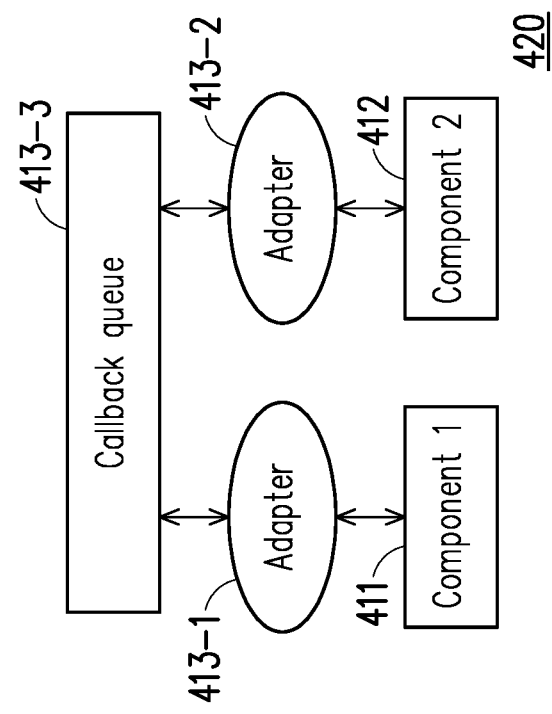
FIG. 5B is a schematic diagram of a target component according to another embodiment of the disclosure.

Referring to FIG. 5B together, FIG. 5B is a schematic diagram of a target component according to another embodiment of the disclosure. In the embodiment, a scripting language 414 may be, for example, another example of the connector 413 shown in FIG. 4B. In detail, when the coupling relationship (for example, the logical relationship) between the target component 411 and the target component 412 is complex, the target component 411 may be coupled to the target component 412 through the scripting language 414. The target components 411 and 412 and the scripting language 414 may be assembled into another component 420.

When the query matching module 311 obtains the target components 411 and 412 from the description library 322, the query matching module 311 provides the target components 411 and 412 having the coupling relationship to the assembly mode generation module 313 for subsequent software development.

On the other hand, when the query matching module 311 cannot obtain the functional component from the component library 321 and cannot obtain the target components from the description library 322, the component packaging platform 340 is enabled to create a new functional component. In detail, the component packaging platform 340 packages semantically analyzed input data to generate one or more functional components. The functional component is different from the functional component stored in the component library 321 (that is, the functional component obtained through the query matching module 311). In the embodiment, the component packaging platform 340 provides the packaged functional component to the component library 321 to update the component library 321.

In the embodiment, since the target components have a coupling relationship, the target components need to be assembled with certain connections, frameworks, templates, or a combination thereof. The assembly mode generation module 313 may query the description library 322 according to the target components to obtain component framework data between the target components. At the same time, the assembly mode generation module 313 may query the template library 323 according to the target components to obtain the component assembly template data between the target components.

On the other hand, the assembly mode generation module 313 may select an appropriate assembly mode according to various description files in the description library 322, and generate a connection code according to the assembly mode to connect the target components. In the embodiment, the component framework data obtained by the assembly mode generation module 313 includes at least one of the component description file, the component connection description file, the component framework description file, and the connection code in the description library 322. In addition, the assembly mode generation module 313 may select the appropriate assembly mode according to the component assembly template data of various modes in the template library 323, and generate the assembly code according to the assembly mode. In the embodiment, the component assembly template data obtained by the assembly mode generation module 313 includes at least one of the direct mode component assembly template data, the indirect mode component assembly template data, and the assembly code in the template library 323.

Continuing with the above description, the assembly mode generation module 313 generates one or more assembly modes between the target components according to the queried component framework data and component assembly template data. In other words, the assembly mode generation module 313 generates and determines a feasible assembly manner between the target components according to the target components.

In the embodiment, the assembly mode detection module 314 detects the assembly mode provided by the assembly mode generation module 313 to generate a detection result. The detection result is configured to indicate whether the assembly mode is suitable for the target components and whether the assembly mode can achieve the functions expected by the user. In other words, the assembly mode detection module 314 detects the correctness of the assembly mode according to the assembly mode, the function corresponding to each target component, and the description of the function of the input data to ensure that the target components can be correctly assembled.

After the assembly mode detection module 314 determines that the assembly mode is correct, the assembly mode detection module 314 provides the detection result to enable the component assembly module 312. Since each assembly mode has a set of assembly codes for the assembly mode between the target components of different types, the component assembly module 312 assembles the detected target components with the corresponding assembly mode based on the assembly codes according to the detection result to generate one or more integrated components. In other words, the component assembly module 312 can automatically assemble the target components to generate the corresponding integrated component.

Next, the component assembly module 312 provides the integrated component to the component library 321. Therefore, the user can access the integrated component in the component library 321 through the interface module. In the embodiment, the integrated component may be, for example, executable software or a complex sub-component.

In the embodiment, the component library manager 360 may provide all the components in the server 300 to the component library 321, so that the component library 321 stores the components. The component may include a business component and a general component. In the embodiment, the business component is a component for implementing a specific function or a custom function. The business component may include a component such as a project component, a task component, a detection component, a basic data entry component, a report component, a thesaurus component, a mechanism component, a service orchestration component, an action component, and a rule component. In the embodiment, the general component is a component for implementing a common or general function. The general component may include a general API call component, a general data export component, a general mail component, etc.

Figure 6:
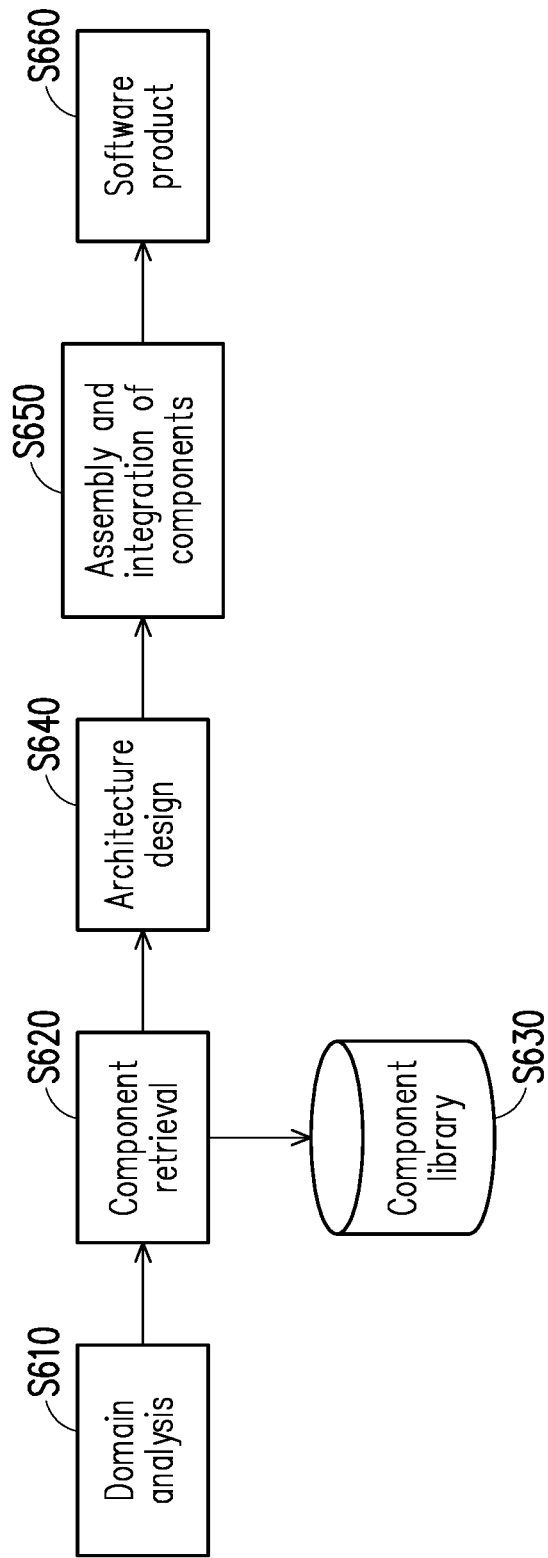
FIG. 6 is a schematic diagram of an action of a software development system according to an embodiment of the disclosure.

FIG. 6 is a schematic diagram of an action of a software development system according to an embodiment of the disclosure. Referring to FIG. 3 and FIG. 6, the software development system 30 may execute multiple modules S610 to S660 to exemplarily illustrate the software development system 30 developing software with the components.

In the module S610, the software assembly platform 310 (for example, an analysis module not shown) performs domain analysis according to the input data provided by the user to generate a domain analysis result. By executing domain analysis through the analysis module, a component that may be reused in a specific domain may be discovered and excavated. The domain analysis result may include a selection principle of the component and a development principle of the component. In the embodiment, the analysis module may be, for example, a trained machine learning module.

In the modules S620 to S630, the software assembly platform 310 (for example, the query matching module 311) retrieves the components according to the domain analysis result, the input data provided by the user, and the component library to generate the functional components and/or the target components. In other words, the query matching module 311 retrieves the component library 321 (and the description library 322) according to the domain analysis result and the semantically analyzed information to obtain the components matching the domain and the semantics.

In the module S640, the software assembly platform 310 (for example, the assembly mode generation module 313 and the assembly mode detection module 314) designs the architecture according to the retrieved components to generate a component list. The component list may include the components, the component framework data, and the component assembly template data to indicate the feasible assembly manner between the components.

In the modules S640 to S650, the software assembly platform 310 (for example, the component assembly module 312) assembles and integrates the components according to the component list to generate the software product. In other words, the component assembly module 312 automatically assembles according to the component list to finally form the software product conforming to the requirements of the user.

In summary, the software development system and the software development method of the disclosure may automatically retrieve the components that fit the target function (that is, the target components and/or the functional components) according to the input data provided by the user, and further automatically assemble and integrate the components according to the components and the database to provide the software product conforming to the target function. In this way, the software development system can reduce the difference in quality of software products and the development cycle, while improving the quality and the efficiency of software development.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A software development system, comprising:
an electronic device, configured to execute an interface module to obtain input data; and
a server, coupled with the electronic device, comprising:
a database, wherein the server is configured to:
obtain at least one of a plurality of target components and at least one functional component according to the input data and the database;
assemble the plurality of target components that have been detected through a connector to generate at least one integrated component for implementing an expected function of a developed software, provide the at least one integrated component to the database, and provide the at least one functional component to the database;
query a description library of the database according to the plurality of target components to obtain component framework data between the plurality of target components, query a template library of the database according to the plurality of target components to obtain component assembly template data between the plurality of target components, and generate at least one assembly mode between the plurality of target components according to the component framework data and the component assembly template data; and
detect the at least one assembly mode between the plurality of target components to generate a detection result,
wherein the server is further configured to assemble the plurality of target components that have been detected in the at least one assembly mode according to the detection result to generate the at least one integrated component.

2. The software development system according to claim 1, wherein there is a coupling relationship between the plurality of target components, and there is no coupling relationship between the plurality of target components and the at least one functional component.

3. The software development system according to claim 1, wherein the server is configured to query the description library of the database based on a semantic analysis module according to the input data to obtain the plurality of target components, and query a component library of the database based on the semantic analysis module according to the input data to obtain the at least one functional component.

4. The software development system according to claim 1, wherein the server is further configured to:
package the input data that has been semantically analyzed to generate at least one second functional component, and provide the at least one second functional component to a component library of the database.

5. The software development system according to claim 1, wherein the server is further configured to:
provide a component description file, a component connection description file, and a component framework description file to the description library of the database.

6. The software development system according to claim 1, wherein the server is further configured to:
provide direct mode component assembly template data and indirect mode component assembly template data to a template library of the database.

7. The software development system according to claim 1, wherein the server is further configured to:
provide a business component and a general component to a component library of the database.

8. A software development method, comprising:
executing an interface module to obtain input data through an electronic device;
obtaining at least one of a plurality of target components and at least one functional component according to the input data and a database of a server through the server;
assembling the plurality of target components that have been detected through a connector to generate at least one integrated component for implementing an expected function of a developed software through the server;
providing the at least one integrated component to the database through the server;

providing the at least one functional component to the database through the server;

querying a description library of the database according to the plurality of target components to obtain component framework data between the plurality of target components through the server;

querying a template library of the database according to the plurality of target components to obtain component assembly template data between the plurality of target components through the server;

generating at least one assembly mode between the plurality of target components according to the component framework data and the component assembly template data through the server; and detecting the at least one assembly mode between the plurality of target components to generate a detection result, wherein the step of assembling the plurality of target components that have been detected to generate the at least one integrated component comprises:

assembling the plurality of target components that have been detected in the at least one assembly mode according to the detection result to generate the at least one integrated component through the server.

9. The software development method according to claim 8, wherein there is a coupling relationship between the plurality of target components, and there is no coupling relationship between the plurality of target components and the at least one functional component.

10. The software development method according to claim 8, wherein the step of obtaining the at least one of the plurality of target components and the at least one functional component according to the input data and the database comprises:

querying the description library of the database based on a semantic analysis module according to the input data to obtain the plurality of target components through the server; and querying a component library of the database based on the semantic analysis module according to the input data to obtain the at least one functional component through the server.

11. The software development method according to claim 8, further comprising:

assembling the input data that has been semantically analyzed to generate at least one second functional component through the server; and providing the at least one second functional component to a component library of the database through the server.

12. The software development method according to claim 8, further comprising:

providing a component description file, a component connection description file, and a component framework description file to the description library of the database through the server.

13. The software development method according to claim 8, further comprising:

providing direct mode component assembly template data and indirect mode component assembly template data to a template library of the database through the server.

14. The software development method according to claim 8, further comprising:

providing a business component and a general component to a component library of the database through the server.

* * * * *